United States Patent [19]
Bateman et al.

[11] 3,934,222
[45] Jan. 20, 1976

[54] TERRAIN CLOSURE WARNING SYSTEM WITH CLIMB INHIBIT AND ALTITUDE GAIN MEASUREMENT

[75] Inventors: Charles Donald Bateman, Bellevue; Hans Rudolf Muller, Kirkland; Frank Joseph Brem, Mountlake Terrace, all of Wash.

[73] Assignee: Sundstrand Data Control, Inc., Redmond, Wash.

[22] Filed: Apr. 2, 1975

[21] Appl. No.: 564,512

[52] U.S. Cl. ........ 340/27 AT; 73/178 R; 235/150.2; 244/77 D; 343/77 A; 343/112 CA; 343/112 A
[51] Int. Cl.² ............................................. G01C 5/00
[58] Field of Search .............. 73/178 R, 178 T, 179; 179/15 A; 235/150.2, 150.22; 244/77 A, 77 D; 340/16 R, 16 M, 16 C, 27, 29, 52 H, 56, 62, 66, 74, 258; 343/5 LS, 7 R, 7 TA, 7 ED, 7 PF:7.7, 8, 9, 12 R, 12 A, 108 R, 112 A, 112 CA, 112 S

[56] References Cited
UNITED STATES PATENTS

| | | | |
|---|---|---|---|
| 2,702,342 | 2/1955 | Korman | 343/112 CA X |
| 2,735,081 | 2/1956 | Hosford | 340/27 R |
| 2,851,120 | 9/1958 | Fogiel | 343/112 CA X |
| 2,930,035 | 3/1960 | Altekruse | 343/7 TA |
| 2,931,221 | 4/1960 | Rusk | 73/179 |
| 3,077,557 | 2/1963 | Joline et al. | 244/77 D X |
| 3,093,807 | 6/1963 | Crane et al. | 73/179 X |
| 3,140,483 | 7/1964 | Sikora et al. | 343/7 TA |
| 3,210,760 | 10/1965 | Olson et al. | 343/7 TA |
| 3,245,076 | 4/1966 | Le Tilly et al. | 343/7 TA |
| 3,248,728 | 4/1966 | Garfield et al. | 340/27 SS X |
| 3,766,518 | 10/1973 | Rilett | 343/7 TA X |

OTHER PUBLICATIONS

Brantley, James Q. *Radar Offers Solution to Midair Collisions*, Electronics, 11-1954, pp. 146–150.

*Primary Examiner*—Trygve M. Blix
*Assistant Examiner*—Stephen G. Kunin
*Attorney, Agent, or Firm*—Ted E. Killingsworth; Michael B. McMurry

[57] ABSTRACT

In a terrain warning system wherein the rate of the aircraft's closure to the terrain is compared to the aircraft's altitude above the terrain in order to generate a warning signal for excessive closure rates, a circuit is provided to inhibit the warning signal when the aircraft begins to climb in response to the warning signal and to measure the altitude gained by the aircraft resulting in the reactivation of the warning signal if the aircraft has leveled off before gaining a predetermined amount of altitude. The circuit includes: a memory element to indicate that a warning signal has been generated; a circuit to generate a climb signal in response to a barometric rate of change signal indicating the aircraft is climbing; and an integrating circuit responsive to the barometric rate signal to determine the amount of altitude the aircraft has gained while climbing. If the aircraft has not gained the predetermined amount of altitude before leveling off, as indicated by the climb signal, the memory element will reactivate the warning signal.

21 Claims, 3 Drawing Figures

TERRAIN CLOSURE WARNING SYSTEM WITH CLIMB INHIBIT AND ALTITUDE GAIN MEASUREMENT

BACKGROUND OF THE INVENTION

The invention relates to aircraft ground proximity warning systems and more particularly to excessive terrain closure rate warning systems.

In the prior art, as specifically represented by Astengo U.S. Pat. No. 3,715,718; the application of Bateman Ser. No. 480,727, filed on June 19, 1974, entitled, "Ground Proximity Warning Instrument"; and the application of Bateman et al. Ser. No. 556,022, filed Mar. 6, 1975, entitled, "Terrain Closure Warning System With Altitude Rate Signal Conditioning," all of which are assigned to the assignee of this application, a signal, derived from a radio altimeter, that represents the rate of change in the aircraft's altitude above ground is compared with a signal from the radio altimeter indicating the aircraft's altitude above the ground to generate a warning signal when the terrain closure rate is excessive for the aircraft's altitude. In the prior art systems, the warning signal remains on as the aircraft continues to approach the terrain and switches off as soon as either the aircraft begins altitude by climbing or when the terrain begins to slope downwardly from the aircraft's flight path.

There are, however, situations in which it would be useful from a safety standpoint to insure that the aircraft has climbed a predetermined distance before leveling off after having received a terrain closure warning signal. This most commonly occurs where the aircraft is traversing terrain having a series of peaks and valleys with slopes that are sufficiently steep to trigger short warnings. Assuming the aircraft is in a level flight over undulating terrain that is gradually increasing in altitude, the aircraft may experience one or more short warnings. However, since each upward slope is followed by a downward slope, the crew of the aircraft responding to the warning signal by observing the radio altimeter would be under the impression that his ground clearance was increasing because the aircraft at that point would be traversing a downward slope. Because such observations of the radio altimeter would appear to indicate that the aircraft is not in actual danger, the aircrew may elect to maintain level flight, thus reducing the aircraft's chances of responding quickly enough to a warning in order to prevent the aircraft's impacting a slope that rises above the aircraft's flight level.

A careful study of a number of accidents in view of the type of terrain that tends to increase in altitude, has indicated that in a large number of cases if the aircrew were to take immediate action on the first short warning and increase the aircraft's altitude by 200 feet, a significant number of potential accidents could be avoided.

SUMMARY OF THE INVENTION

It is therefore an object of the invention to provide a system that would insure that an aircraft gained at least 200 feet in altitude after a terrain closure warning has been generated.

It is an additional object of the invention to provide an improved terrain closure warning system wherein the aircraft's rate of change in barometric altitude is used to indicate: first, the aircraft is climbing; and second, it has gained a predetermined altitude before leveling off; otherwise the warning signal is reactivated until the aircraft either begins to climb again or gains the predetermined additional altitude.

It is a further object of the invention to provide a circuit to cooperate with a terrain closure warning system wherein the rate of barometric altitude change signal is used to indicate whether or not the aircraft is climbing and if so, to inhibit the warning signal; and wherein the rate signal is integrated to determine the amount of altitude the aircraft has gained; and also included is a memory element which indicates that a warning signal has been received and is used to reactivate the warning signal if the aircraft should cease climbing below the predetermined minimum gain in altitude.

As soon as a warning signal has been generated by the terrain closure warning system, a memory element, preferablly a flip flop, will set indicating that a closure warning has occurred. This will tend to maintain a continuous warning to the aircrew eventhough the aircraft is not actually closing with the terrain any longer, as in the case of traversing the downward slope of a hill. Thus, the warning will continue until the aircrew begins to take some action. During this period the signal representing the aircraft's rate of change in barometric altitude is monitored and if it should indicate a rate of climb above a predetermined value, the warning signal is inhibited. Therefore, as soon as the aircraft begins to climb at a predetermined rate, the actual warning to the aircrew will cease. However, there is a provision for maintaining the warning signal on when the aircraft continues to approach the terrain eventhough it is climbing at a rate above the predetermined value. This provision is useful where the aircraft is approaching a particularly steep slope and it is desirable to maintain or even increase the rate of climb.

At the same time, the barometric rate signal is being integrated to determine the amount of altitude that is being gained by the aircraft. When the gain in altitude has exceeded a predetermined amount, for example the 200 feet that was previously discussed, a reset signal is applied to the flip flop, thereby eliminating it as a source of the warning signal. However, if the aircraft should discontinue climbing below the 200 feet of altitude gain, the inhibit will be removed from the warning signal and the warning to the aircrew will resume. But, on the other hand, if the aircraft should level off above 200 feet, no warning will be generated due to the fact that the flip flop will no longer be a source of the warning signal.

In addition, the resetting of the flip flop will serve to clamp the integrator back to zero so that the integrator will not hold a charge that would tend to bias its future operation. Also, the flip flop can be reset by a flap signal indicating that the aircraft is less than 50 feet above the ground. This is provided so as to allow the aircraft to approach a landing without having a warning that is generated by conditions that reflect no real danger to the aircraft to remain on continually.

DETAILED DESCRIPTION OF THE INVENTION

Figure 1:
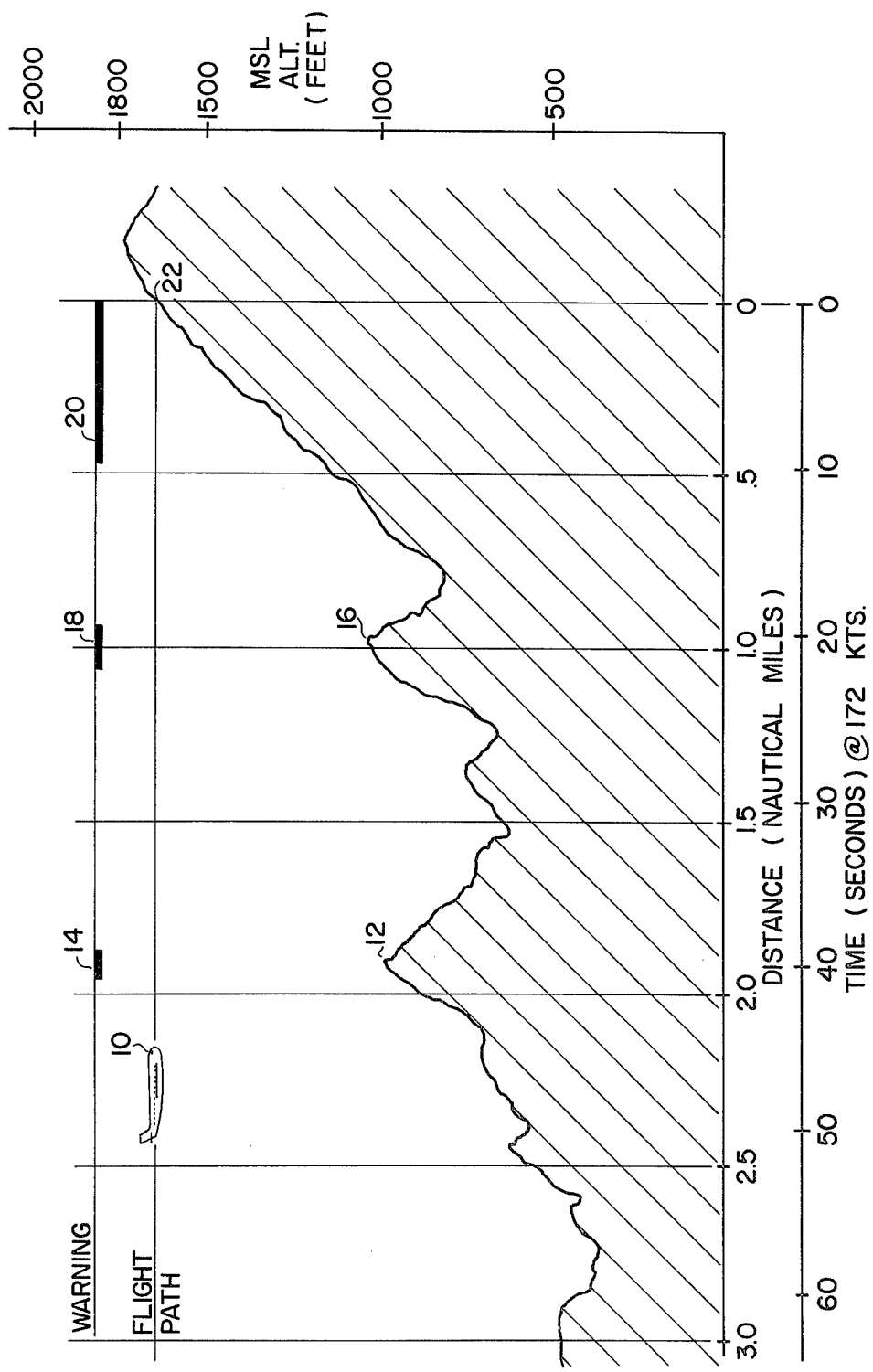
FIG. 1 is an illustration of a flight profile over terrain with increasingly higher peaks.

FIG. 1 presents a flight path of an aircraft 10 over undulating terrain having increasingly higher peaks. As the aircraft approaches the first peak 12, a short warning 14 would be generated by a terrain closure warning system. Since the terrain begins to slope downwardly after the aircraft has passed the peak 12, a glance at the radio altimeter might give the impression that the aircraft is not in any real danger. As the aircraft continues along the flight path and approaches the second peak 16, another, somewhat longer, warning 18 is generated. Again, a glance at the radar altimeter after passing peak 16 would give the impression that the aircraft is not in danger since the aircraft's altitude above the terrain seems to be increasing. If the aircraft were to continue in its original flight path, the third and final warning would occur approximately 9 seconds before impact at point 22 on the highest hill.

It therefore can be appreciated that, while in this particular illustration 9 seconds may be adequate warning time to avoid the peak if the crew takes immediate action, it would certainly enhance the overall operational safety of the aircraft to climb an additional 200 feet or more after the first warning 14.

Figure 2:
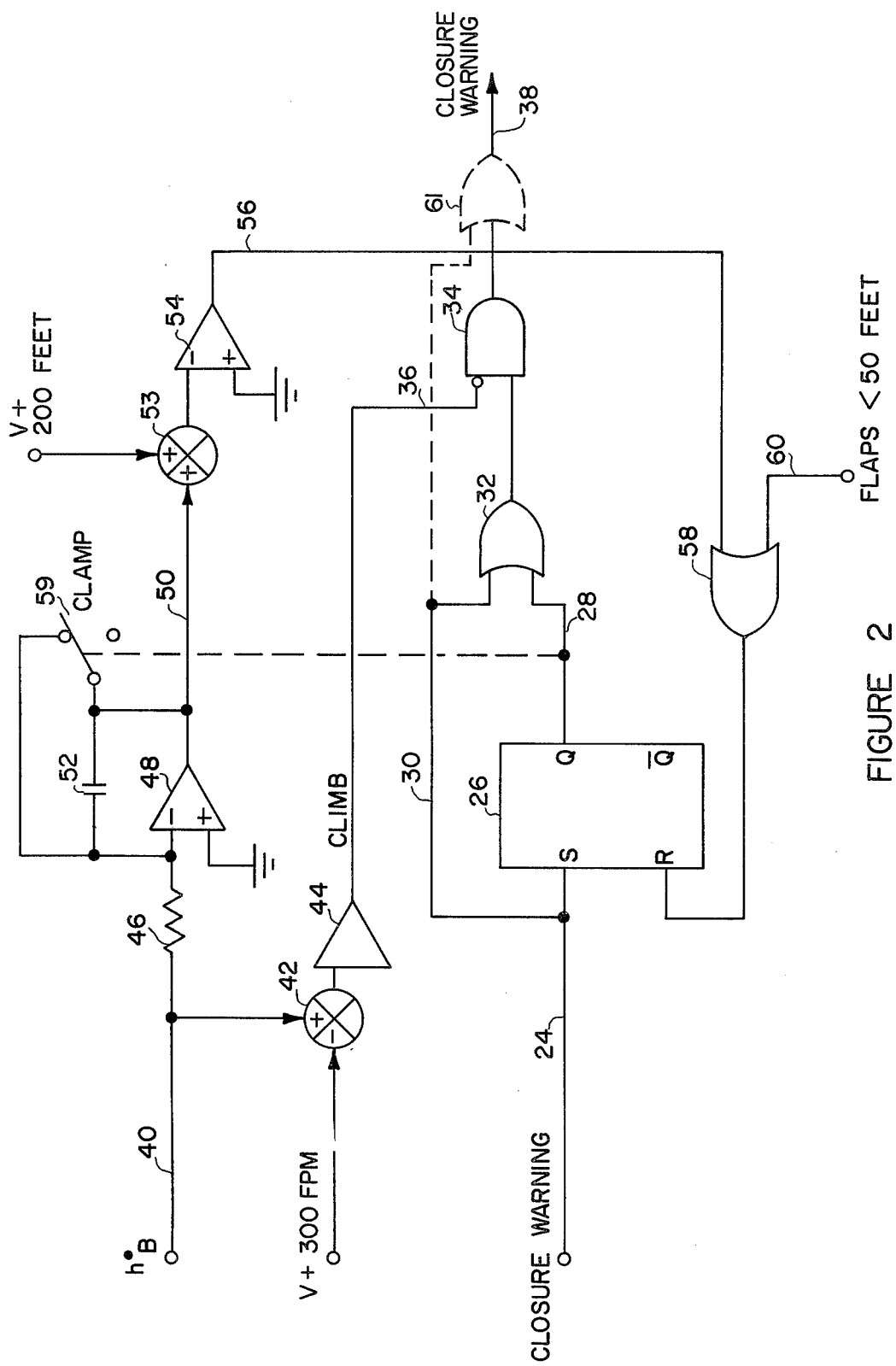
FIG. 2 is a functional block diagram of the warning maintenance circuit.

The preferred embodiment of a circuit insuring that the warning signal remains on until the aircraft begins to climb and has gained another 200 feet in altitude is provided in FIG. 2 of the drawings. The initial warning signal corresponding to 14 of FIG. 1 is received over line 24 from the terrain closure warning system (not shown). A complete disclosure of how the generation of a warning signal is accomplished by comparing the terrain closure rate with the aircraft's altitude is provided in Astengo U.S. Pat. No. 3,715,718 and the applications of Bateman Ser. No. 480,727 and the application of Bateman entitled et al. Ser. No. 556,022, entitled "Terrain Closure Warning System With Altitude Rate Signal Warning Conditioning". The effect of the warning signal on line 24 will be to set the flip flop 26 thereby producing a high output on the Q terminal and on line 28. The warning signal is also transmitted around the flip flop 26 on line 30 through the OR gate 32 to the AND gate 34. Assuming at this point that the aircraft is in level flight, the signal on line 36 will be low. The signal on line 36 is inverted and is used as an input to the AND gate 34 thus permitting the warning signal to be transmitted on line 38 to a warning generator (not shown). Preferably the warning generator will produce, in addition to the appropriate flashing light, an oral warning such as "PULL UP—PULL UP".

A second input to the circuitry in FIG. 2 is the $\dot{h}_B$ signal, derived from the aircraft's barometric altimeter which represents the rate of change in the aircraft's barometric altitude. The $\dot{h}_B$ signal is utilized as an input to the positive terminal of the summing junction 42 with a voltage representing a climb rate of 300 feet per minute being applied to the negative terminal of the summing junction 42. The output of the summing junction 42 is then transmitted to the detector 44. Detector 44 as a result will place a high signal on line 36 whenever the $\dot{h}_B$ signal exceeds a positive 300 feet per minute. A climb rate having a minimum of 300 FPM was selected in view of the fact that air turbulence can very often impart climb rates of as much as ±300 FPM. Therefore in order to avoid an incorrect assumption of a climb situation, the $\dot{h}_B$ signal is, in effect, biased by 300 FPM. In addition, the 300 FPM climb rate also corresponds to the worst case, one engine out climb speed for a turbine powered aircraft. In any event, it should be remembered that the primary purpose of the positive signal on line 36 is to provide a reliable indication that the aircraft is in fact climbing. As discussed above, a high signal on line 36 will have the effect of turning off the AND gate 34 thereby discontinuing the warning to the aircrew. Thus, as indicated climb rate of 300 FPM or greater will serve to inhibit the closure warning signal on line 38.

The $\dot{h}_B$ signal on line 40 is also utilized an an input, through the resistor 46, to the negative terminal of the integrating amplifier 48. The output of the integrating amplifier 48 on line 50 will reflect the integration of the $\dot{h}_B$ signal over time, thereby giving an indication of the amount of altitude that the aircraft has gained. The time constant of the integrating amplifier 48 is governed by the values of the resistor 46 and the capacitor 52. The measure of the aircraft's gain in altitude on line 50 is applied to the summing junction 54 along with a voltage that represents 200 feet. Connected to the summing junction 53 is the comparator 54 which produces a high signal on the line 56 when the aircraft has gained 200 feet or more. A high signal on line 56 serves as a reset signal and is transmitted through the OR gate 58 to the reset terminal R of the flip flop 26. The OR gate 58 also receives a signal on line 60 that when high indicates that either the aircraft's flaps are down or that the aircraft is less than 50 feet above the ground. This signal also serves to reset the flip flop 26 thus tending to eliminate nuisance warnings when the aircraft is in a landing approach phase of operation. In addition, the resetting the flip flop 26 serves to activate the clamping circuit 59 which brings the output of the integrator on line 50 back to zero and holds it there while the flip flop 26 is in a reset condition. This serves to clear the output of the integrator until another warning signal is received over line 24.

In recognition of the fact that under certain circumstances the aircraft, although climbing, may still be closing with the terrain, for example where it is approaching rising terrain with a particularly steep slope, it is considered desirable to keep the warning signal on in order to discourage the crew from leveling off too soon or to encourage the crew to increase the rate of climb. To this end, the OR gate 61, represented by the dashed lines in FIG. 2, is included in the circuit. Gate 61 will be effective to maintain a positive warning signal when the aircraft is still approaching the terrain eventhough it is climbing at a rate of 300 FPM or greater.

Figure 3:
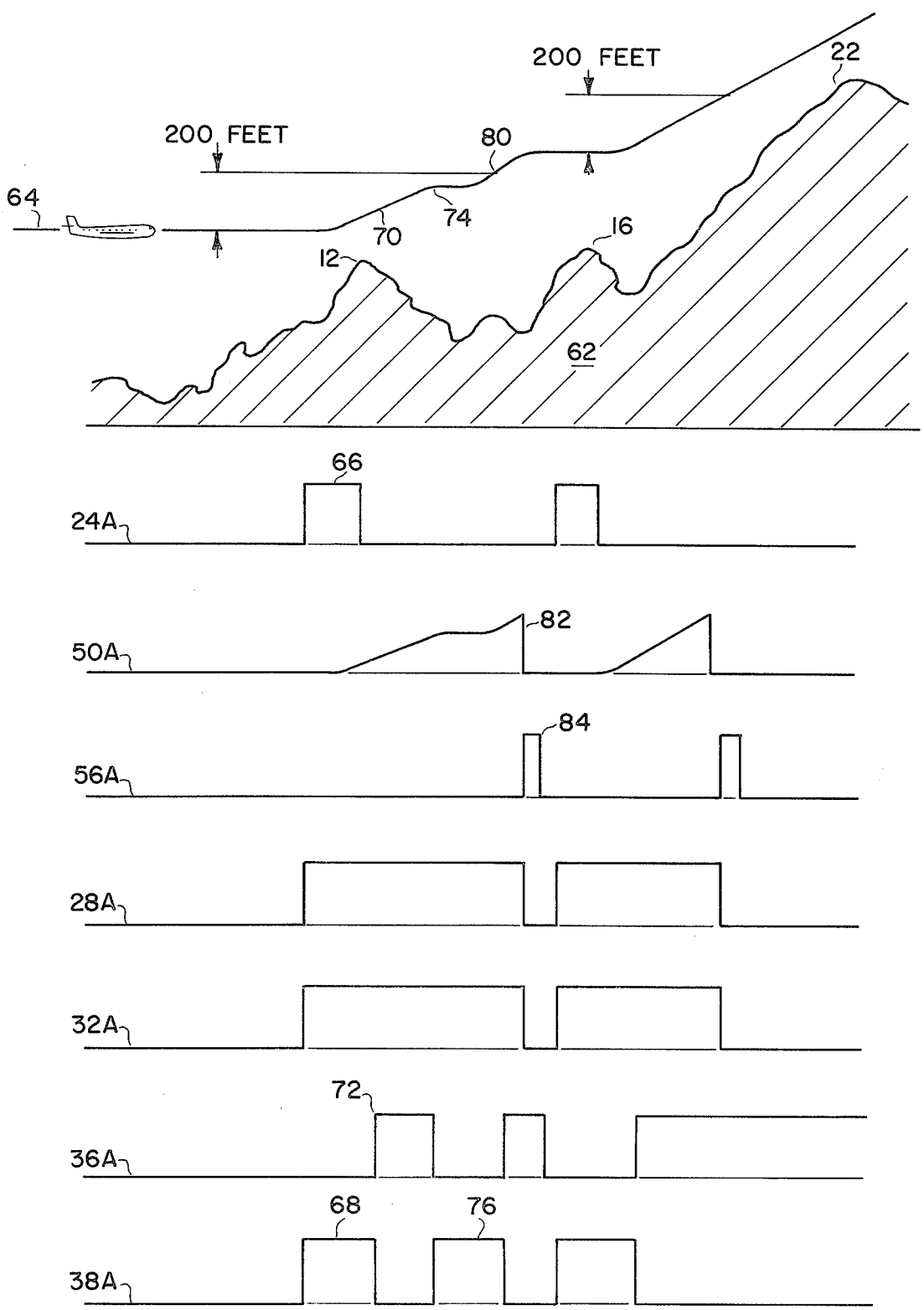
FIG. 3 is a timing chart illustrating the operation of the circuit in FIG. 2 for the flight profile of FIG. 1.

The operation of circuit in FIG. 2 is illustrated by the timing chart provided in FIG. 3. The terrain 62 shown in FIG. 3 corresponds to the terrain shown in FIG. 1, and the aircraft's flight profile is indicated by the line 64. As the aircraft approaches the peak 12, a warning signal is generated on line 24 of FIG. 2, corresponding to the pulse 66 in waveform 24A of FIG. 3. Waveform 24A of FIG. 3 illustrates the signals on line 24 of FIG. 2. The effect of the warning signal on line 24 is to set the flip flop 26 producing the output on line 28 corresponding to waveform 28A of FIG. 3. The warning signal is transmitted through the OR gate 32 and through the AND gate 34 to the line 38 corresponding to the high signal 68 shown on waveform 38A of FIG. 3.

Then, as the aircraft begins to climb, in response to the warning signal, to point 70 of the flight profile 64, a high signal is generated on line 36 by the detector 44 corresponding to the beginning of the high signal 72 on the waveform 36A of FIG. 3. This results in the termination of the high signal 68 on line 38 since the AND gate 34 is shut off by the high signal 72 on line 36. Thus it is apparent that a rate of climb of over 300 FPM at point 70 of the flight profile 64 will be effective to inhibit the terrain closure warning. Assuming the aircraft again levels off at point 74 on the flight profile, before gaining 200 feet, the signal on line 36 will go low which will again have the effect of permitting another warning pulse 76 on line 38. Responding to the renewed warning, the aircraft again begins to climb until it passes the 200 foot mark at point 80 whereupon the integrator 48 output, illustrated by the curve 82, on waveform 48A will cause a pulse 84 on line 56 having the effect of resetting the flip flop 26. Here the output of the Q terminal of the flip flop 26 on line 28 will go low, thus terminating the warning pulse 76.

As may be observed from the timing diagram in FIG. 3, the same sequence of events will occur when the aircraft approaches the second peak 16. Thus, the circuitry of FIG. 2 will, in effect, force the crew of the aircraft to climb at least 200 feet above their previous flight level every time they get a terrain closure warning.

The preferred embodiment of the invention has been described in terms of the analog-logic circuit of FIG. 2. However, the invention can also be implemented in a digital circuit or computer where, for example, the fact that a warning signal has been generated or the aircraft is climbing could be stored as flags in a random access memory or in a register. It would also be possible to use a micro-processor or the like to compute the gain in altitude instead of using the analog integrating circuit 48 of FIG. 2.

We claim:

1. In a terrain closure warning system that generates a warning signal indicating an excessive rate to the terrain, wherein the improvement comprises:
   means for indicating that the aircraft is climbing at a predetermined rate;
   means for measuring the aircraft's gain in altitude;
   means, responsive to said indicating means and said measuring means, for reactivating the warning signal when the aircraft has discontinued climbing at said predetermined rate and has not gained a predetermined amount of altitude.

2. The warning system of claim 1 additionally including configuration means, responsive to the aircraft's flight configuration and to an altitude above ground signal, for preventing the reactivation of the warning signal below a predetermined altitude or when the aircraft is in a predetermined flight configuration.

3. The warning system of claim 1 additionally including means for maintaining the warning signal eventhough the aircraft is climbing at a rate greater than said predetermined rate when the closure rate is excessive.

4. In a terrain closure warning system utilizing a signal representing the aircraft's altitude above the ground, a signal representing the aircraft's rate of change in barometric altitude and a means for comparing the aircraft's rate of closure with the terrain with the aircraft's altitude above the ground to generate a terrain closure rate warning signal, wherein the improvement comprises:
   means responsive to the rate of change in barometric altitude signal for generating a climb signal indicating that the aircraft is climbing;
   means, responsive to the barometric altitude signal, for measuring the aircraft's altitude gain;
   means, responsive to said climb indicating means and said measuring means, for reactivating the warning signal when the aircraft has discontinued climbing and has not gained a predetermined amount of altitude.

5. The warning system of claim 4 additionally including means, responsive to the terrain closure rate warning signal, for maintaining the warning signal in the presence of said climb signal.

6. The warning system of claim 4 additionally including means, responsive to said climb signal, for inhibiting the warning signal while the aircraft is climbing.

7. The warning system of claim 5 additionally including configuration means, responsive to the aircraft's flight configuration and to the altitude above ground signal, for preventing the reactivation of the warning signal below a predetermined altitude or when the aircraft is in a predetermined flight configuration.

8. The system of claim 7 wherein said indicating means includes:
   bias signal means for generating a signal representing a predetermined rate of climb; and
   detector means for generating said climb signal when the aircraft's rate of climb exceeds said predetermined rate of climb.

9. The system of claim 6 wherein said inhibit means includes a logic gate responsive to both the warning signal and said climb signal effective to inhibit the warning signal in the presence of said climb signal.

10. The system of claim 8 wherein said measuring means includes an integrating circuit for integrating the barometric rate signal over time.

11. The system of claim 10 wherein said reactivating means includes:
    a memory element for generating a reactivation signal in response to the warning signal;
    a source of a bias signal representing said predetermined amount of altitude gain; and
    a comparator circuit, operatively connected to said bias signal source and said memory element, effective to reset said memory element thereby discontinuing said reactivation signal when the aircraft has exceeded said predetermined amount of altitude gain.

12. The system of claim 11 wherein said memory element is operatively connected to said integrating circuit and is effective to clamp the output of said integrating circuit when said memory element is reset.

13. The system of claim 12 wherein said configuration means is operatively connected to said memory element and is effective to reset said memory element.

14. An altitude measuring and inhibiting system for use in a terrain closure warning system utilizing a radio altitude signal, a signal representing the aircraft's rate of change in barometric altitude and a warning signal representing excessive terrain closure rate, comprising:
    memory means, responsive to said warning signal, for generating a set signal;
    detector means, responsive to the barometric rate signal, for generating a climb signal for indicated rates of climb of approximately 300 feet per minute and greater;

measuring means, responsive to the barometric rate signal, for calculating the aircraft's gain in altitude;

reset means, responsive to said measuring means and operatively connected to said memory means, for discontinuing said set signal when the aircaft has gained over approximately 200 feet in altitude;

logic means, responsive to said set signal, the warning signal and said climb signal, for reactivating the warning signal when the aircraft has gained less than approximately 200 feet and is climbing at an indicated rate of less than 300 feet per minute.

15. The system of claim 14 wherein said logic means includes means for maintaining the warning signal in the presence of said climb signal.

16. The system of claim 14 wherein said reset means is responsive to a signal indicating the aircraft's flaps are down.

17. The system of claim 14 wherein said reset means is responsive to the radio altitude signal at altitudes of approximately 50 feet and below.

18. An electronic circuit for use in an aircraft terrain closure warning system comprising:

an integrating circuit, responsive to a barometric altitude rate signal, effective to generate a signal representing gains in aircraft altitude;

a detector circuit, including a rate bias signal source, responsive to said barometric rate signal, effective to generate a climb signal;

a comparator circuit including an altitude bias signal source, responsive to said altitude gain signal effective to generate a reset signal when said altitude gain signal exceeds said altitude bias signal;

a flip flop memory element, which is set by a closure warning signal and wherein said flip flop is reset by said reset signal;

a first logic element operatively connected to said flip flop and responsive to said warning signal;

a second logic element operatively connected to said first logic element and said detector circuit, effective to reproduce said warning signal in the absence of said climb signal when said flip flop is set; and a clamp circuit, operatively connected to said integrating circuit and said flip flop, effective to clamp the output of said integrating circuit to a nominal value when said flip flop is reset.

19. The electronic circuit of claim 18 additionally including a third logic element, operatively connected to said second logic element and responsive to said warning signal, effective to pass both said warning signal and said reproduced warning signal.

20. The electronic circuit of claim 19 additionally including a fourth logic element operatively connected to said flip flop effective to reset said flip flop in response to a flap signal or to a signal indicating a minimum altitude.

21. The electronic circuit of claim 20 wherein said first, third, and fourth logic elements are OR gates and said second logic element is an AND gate.

* * * * *

UNITED STATES PATENT OFFICE
CERTIFICATE OF CORRECTION

PATENT NO. : 3,934,222
DATED : January 20, 1976
INVENTOR(S) : Charles Donald Bateman, Hans Rudolf Muller, Frank Joseph Brem It is certified that error appears in the above-identified patent and that said Letters Patent are hereby corrected as shown below:

In column 5, line 40, "excessive" should read --excessive closure--.

Signed and Sealed this eighth Day of June 1976

[SEAL]

Attest:

RUTH C. MASON
Attesting Officer

C. MARSHALL DANN
Commissioner of Patents and Trademarks